(12) United States Patent
Carr et al.

(10) Patent No.: US 11,909,207 B2
(45) Date of Patent: Feb. 20, 2024

(54) HIERARCHICAL METHOD FOR PREDICTION OF LOADS WITH HIGH VARIANCE

(71) Applicant: ABB Schweiz AG, Baden (CH)

(72) Inventors: Joseph Carr, Raleigh, NC (US); Alexander Brissette, Raleigh, NC (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/197,625

(22) Filed: Mar. 10, 2021

(65) Prior Publication Data

US 2022/0294216 A1 Sep. 15, 2022

(51) Int. Cl.
| | |
|---|---|
| *F24F 11/63* | (2018.01) |
| *G05B 13/02* | (2006.01) |
| *H02J 3/00* | (2006.01) |
| *G05B 13/04* | (2006.01) |
| *H02J 3/14* | (2006.01) |
| *G06N 3/044* | (2023.01) |

(52) U.S. Cl.
CPC .............. *H02J 3/003* (2020.01); *F24F 11/63* (2018.01); *G05B 13/027* (2013.01); *G05B 13/048* (2013.01); *G06N 3/044* (2023.01); *H02J 3/14* (2013.01); *H02J 2310/60* (2020.01)

(58) Field of Classification Search
CPC .......... H02J 3/003; H02J 3/14; H02J 2310/60; F24F 11/63; G05B 13/027; G05B 13/048
USPC ......................................................... 700/276
See application file for complete search history.

(56) References Cited

U.S. PATENT DOCUMENTS

| | | | |
|---|---|---|---|
| 4,916,328 A | 4/1990 | Culp, III | |
| 10,203,674 B1* | 2/2019 | Hoff | .......................... F24F 11/46 |
| 2003/0050738 A1 | 3/2003 | Masticola et al. | |
| 2005/0107892 A1* | 5/2005 | Matsui | ...................... H02J 3/38 |
| | | | 700/28 |
| 2005/0234600 A1 | 10/2005 | Boucher et al. | |
| 2011/0231320 A1 | 9/2011 | Irving | |
| 2011/0264291 A1 | 10/2011 | Le Roux et al. | |
| 2012/0296482 A1 | 11/2012 | Steven et al. | |
| 2013/0030590 A1 | 1/2013 | Prosser | |
| 2013/0289772 A1 | 10/2013 | Friedrich et al. | |
| 2014/0094979 A1 | 4/2014 | Mansfield | |
| 2015/0355650 A1 | 12/2015 | Friedrich et al. | |
| 2016/0020609 A1 | 1/2016 | Carrasco et al. | |
| 2016/0363950 A1 | 12/2016 | Friedrich et al. | |
| 2017/0169344 A1* | 6/2017 | Mangharam | ........... G06N 5/025 |
| 2017/0237289 A1 | 8/2017 | Thompson et al. | |
| 2018/0219374 A1 | 8/2018 | Pavlak et al. | |
| 2018/0238572 A1* | 8/2018 | Murugesan | ............... F24F 11/30 |

(Continued)

OTHER PUBLICATIONS

Extended European Search Report, issued by the European Patent Office, regarding corresponding patent application Serial No. EP22161129.6;dated Jul. 29, 2022; 10 pages.

*Primary Examiner* — Jigneshkumar C Patel
(74) *Attorney, Agent, or Firm* — Greenberg Traurig, LLP

(57) ABSTRACT

A method and system are provided for improving predictions of electrical power usage. In the method and system, load and/or environmental data is classified into data sets that correspond to different modes of operation of an electrical load. Different predictive models are also provided for each set of classified data. The predictive models may provide more efficient and/or more accurate predictions of power usage since each model is limited to a particular mode of operation.

23 Claims, 4 Drawing Sheets

(56) References Cited

U.S. PATENT DOCUMENTS

| | | |
|---|---|---|
| 2018/0314220 A1 | 11/2018 | Kumar et al. |
| 2019/0024918 A1 | 1/2019 | Brissette et al. |
| 2019/0271483 A1* | 9/2019 | Joo .......................... F24F 11/80 |
| 2021/0158194 A1* | 5/2021 | Shiraki .................... G06N 3/08 |

* cited by examiner

HIERARCHICAL METHOD FOR PREDICTION OF LOADS WITH HIGH VARIANCE

BACKGROUND

The present inventions relate generally to managing electrical loads, and more particularly, to predicting electrical power consumption.

One example of an electrical load with high variance in power consumption is HVAC systems. Without methods to predict power consumption of such electrical loads, electrical distribution can be inefficient and increased electrical charges may be applied to the user. On the other hand, when accurate power consumption predictions are possible, electrical loads may be shed from the grid or electrical supplies may be increased based on the prediction to efficiently compensate electrical power distribution.

SUMMARY

A method and system are described for predicting electrical power consumption. The method includes classifying input data into different modes of operation. The classified data is then used in predictive models assigned to corresponding modes of operation. Thus, predictions of electrical energy usage are expected to be more accurate since different predictive models can be refined for specific modes of operation. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
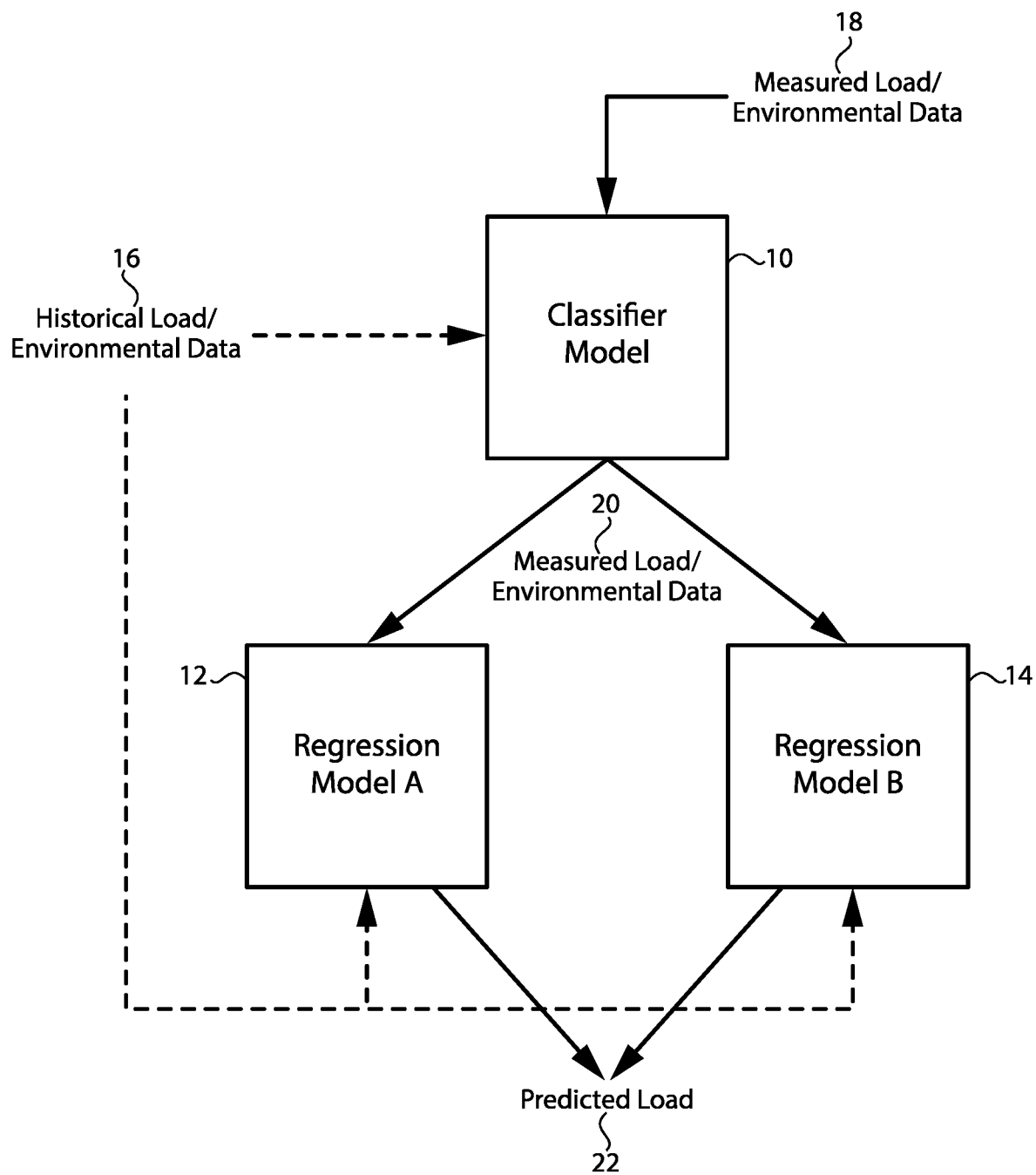
FIG. 1 is a flow chart of a method of predicting an electrical load.

The invention herein may use a machine learning solution approach to improve the prediction of loads with large peaks, such as from HVAC systems, water heaters and the like in residential or commercial buildings. Such systems can often draw two or even three times the baseline power during their operation, which results in a load profile that can be difficult to predict. Thus, it would be desirable to be able to predict the near-future consumption of an electrical load which operates in two or more operational modes. The methods herein may be particularly useful for utility demand response programs which reward users who shift energy usage to low demand periods or energy programs that employ energy usage programs. Although the prediction timing may vary considerably based on the particular application, it may be desirable to predict electrical power consumption more than 5 minutes into the future. In some cases, it may be desirable for predictions to be hours in advance of a particular time but may be less than 10 hours.

A physics-based model may be able to predict HVAC behavior, but such models depend on experts and precise measurements for accuracy. Additionally, if any parameter of the building changes (e.g., something as simple as opening a window), the model can lose accuracy. Machine learning approaches may be preferable over physics-based models since they do not require expert training and need fewer additional measurements beyond the historical behavior of the load to be predicted. However, prediction models based on data with a high variance tend to be inaccurate, for example, when used for residential and commercial loads. One problem with conventional prediction models is that they try to find some sort of average behavior which poorly predicts both the peaks and valleys. In the preferred embodiments described herein, a two stage prediction approach may be used. In the first state, a classifier is used to determine whether the load is in a peak or trough (e.g., whether the HVAC is on or off). Then in the second stage, a regression model that is trained based on peak or valley values is used to get the precise load value. Thus, separate predictive models may be developed (e.g., trained) and used for different modes of operation of an electrical load. Although the modes of operation may be as few as two modes, it is contemplated that an electrical load may have three or more modes of operation (e.g., different power levels) and different predictive models may be provided for each of the identified modes. It is understood that each mode of operation may consume electrical energy although the difference in energy usage between the modes may be substantial. For example, even though one mode of operation for an HVAC system may be off, the HVAC system may still use a certain amount of electrical energy in the off mode in order to power fans, monitoring systems, etc. The system herein is anticipated to improve the prediction of loads with high variance, like residential or commercial loads with HVAC units. Thus, the method uses a hierarchical machine learning approach to improve the prediction of loads with high variability.

One hierarchical load prediction architecture is shown in FIG. 1. As shown, the method uses a multi-step process to predict electrical load. The hierarchical load prediction architecture may include at least three machine learning models. First, a classifier model 10 may determine the mode of operation. The classifier may be a machine learning tool that examines a set of input data 18 and fits it into one of two or more classes 20 (e.g., first and second sets of data 20). The classifier may use classic neural network algorithms like Perceptron, decision trees, or support vector machines (SVMs), or any other machine learning algorithm. The classifier may be trained using a set of historical load and/or environmental data 16. Thus, use of the classifier is preferably a two step process. In the first step, the classifier 10 may be trained using an historical data set 16 to identify modes of operation of an electrical load. In the second step, the classifier 10 operates to make predictions based on current data 18 about what mode of operation 20 the electrical load will be operating in at a time in the future. (Training is illustrated in dashed lines in the figures while operational use of the models is illustrated in solid lines in the figures). For example, at the top level, the classifier model (or combination of models) 10 may determine the mode of operation of an appliance as an output 20 based on inputs 18 such as outdoor air temperature, user setpoints (i.e. thermostat setpoint), time of day, power usage, etc.

The classes may be different modes of operation of the load, including different levels of power consumption (e.g., a lower power level and a higher power level). For example, the load may be an HVAC system, but similar loads might include water heaters, refrigerators or other appliances. The loads may have a low (or zero) energy consumption in one mode and a high energy consumption in a second operational mode, which may correspond to the electrical device being off in one mode and on in the other mode. Alternatively, the modes of operation may be defined by multiple data clusters of a variable power load which can identify different modes based on inputs. The classes may also be applied to an aggregated household or building load that has discernable peaks and valleys in power consumption. It is understood that while the figures show the input data 18 being classified 10 into two modes 20 for two models 12, it would also be possible for the input data 18 to be classified into more than two data sets 20 (e.g., three or more modes) with a corresponding number of models 12, 14.

Once the mode of operation has been determined, the segregated measured data 20 may be passed on to the regression model 12, 14 for that mode of operation. The regression models 12, 14 take the classified input data 20 and use it to predict the output value 22 on a continuous range of values. For example, the first model 12 may be used to predict a first power consumption for a first period based on the data 20 passed to the first model 12 by the classifier 10. Likewise, the second model 14 may be used to predict a second power consumption for a second period based on the data 20 passed to the second model 14 by the classifier 10. Preferably, none of the data 20 used for predictions from the first model 12 is used for predictions by the second model 14 and vice versa. The expected power consumption 22 is then determined using the output of the first or second models 12, 14 or both models 12, 14. For instance, the first model 12 may be used to determine the expected power consumption 22 when the electrical device is predicted to be operating in the first mode by the classifier 10, and the second model 14 may be used to determine the expected power consumption 22 when the electrical device is predicted to be operating in the second mode by the classifier 10. Typically, the first and second models 12, 14 will be used in determining expected power consumption 22 for different, non-overlapping time periods. In response to the expected power consumption determination 22, an electrical load is preferably shed (e.g., turned off or power limited) or the electrical supply is increased (e.g., a status signal sent to a grid operator). In some embodiments, the electrical load that is shed may be the electrical device itself that is being monitored by the system.

Although the regression models 12, 14 may use the same algorithms as the classifier 10, a Recurrent Neural Network (RNN) is particularly well suited since it takes the recent behavior of the load as an input to the prediction 22. However, each of the regression models 12, 14 is preferably only trained on the data 16 from a single mode of operation, i.e., the data classified 16 for that model 12, 14. Thus, although the regression models 12, 14 may both be the same type of model, each model 12, 14 will be different from each other due to the different training applied to each model 12, 14. Since the regression model 12, 14 does not have to take into account data 16 from other modes of operation, the model 12, 14 is able to more accurately predict the value 22 of a load in that mode of operation. Because the classifier 10 has determined the mode of operation before sending the classified data 20 to the regression model 12, 14, the prediction of the power consumption 22 for the load is expected to be more accurate than conventional predictions. Thus, at the bottom level, there may be separate power prediction models 12, 14 for each mode of operation where the separate models 12, 14 predict the near-future power consumption 22 as an output based on inputs 18, 20 such as outdoor air temperature, user setpoints, time of day, etc.

In the case of HVAC load prediction, the classifier 10 may be trained using outdoor temperature, a thermostat setpoint, time of day or the previous state of the HVAC (on/off or power level) or the like and combinations thereof 16. Using such input data 16 is likely to provide reasonable accuracy in predicting whether the system is on or off. The regression models 12, 14 may be trained using the measured HVAC power consumption 18 for the data classified 20 for the model 12, 14 as well as indoor temperature, thermostat setpoint or the like and combinations thereof 18, 20.

Figure 2:
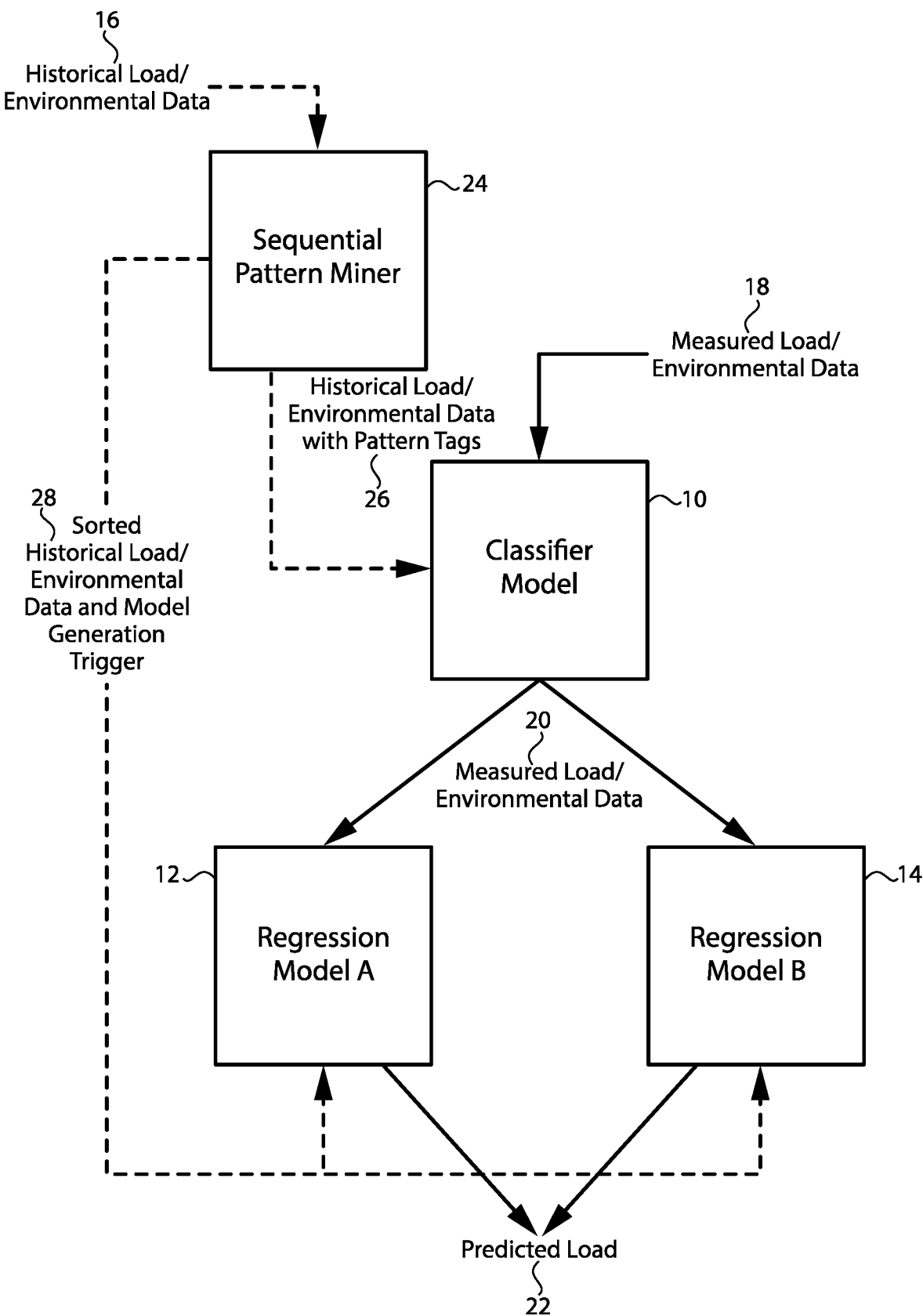
FIG. 2 is another flow chart of another method of predicting an electrical load.

Various additional improvements may also be made to the method. For example, a hierarchical load prediction with automated mode of operation identification is shown in FIG. 2. In this embodiment, a third layer of the hierarchy may be added with a sequential pattern miner 24 at the beginning of the process. The pattern miner 24 may evaluate historical data 16 to identify patterns. The patterns preferably correspond to modes of operation of the load data. The historical data 16 may then be tagged with the patterns 26 and passed to the classifier 10 to train it to differentiate between the discovered modes of operation. At the same time, the pattern miner 24 may trigger a model trainer 28 to create a regression model 12, 14 for each identified mode of operation and may pass the sorted data 20 to train the regression models 12, 14. Once the models 12, 14 are trained, the system may operate on measured data 18 and may make predictions 22 like the system previously described.

Thus, this embodiment may eliminate the need for a human to label the data. The system may also discover new modes of operation that a human may not be aware of or think to include, such as a lower power mode of the HVAC in fan only operation, or for periods when the outdoor temperature is low, or modes influenced by factors that humans may not be able to identify.

It is understood that training of the classifier 10 (and also the second level prediction models) may be done using either supervised or unsupervised learning. For example, supervised learning may use past data 16 (e.g., power usage, outdoor air temperature, user setpoints, time of day, etc.) which is labeled with the corresponding mode of operation for each time period based on a manual analysis or algorithm analysis. Supervised learning may also use past data labels for each point in time which have been stored in a database (e.g., by a building automation system). It is possible that the training data 16 may include the mode of operation as determined from a building system, such as the power level status of the HVAC system, water heater, etc. (e.g., on/off or power level). Unsupervised learning may involve two stages of learning. First, an unsupervised pattern miner 24 may use past data 16 that is not labeled (e.g., does not include defined modes of operation) and may determine corresponding modes of operation 26. Next, the classifier 10 may be trained using the labeled data 26 which has been determined by the pattern miner 24. An unsupervised learning model may also be used where the two steps are accomplished by a single model.

After the modes of operation are known and data 16, 20 separated based on the different modes by the classifier 10, each bottom layer model may be trained separately based on only the data 16, 20 assigned to each model 12, 14 by the classifier 10.

In operation, at any given point in time, the top layer 10 uses recent, present, and/or near-future input data 18 to predict the present and/or near-future mode of operation 20.

Then, based on the predicted mode of operation 20 (or modes, if the prediction is multiple time points in the future), the corresponding bottom layer model 12, 14 is operated to produce a prediction of power consumption 22 for the electrical load. Whether the input data 18 includes past, present or future inputs may depend on availability, e.g., outdoor temperature forecasts may be available but power consumption forecasts may not be available.

Figure 3:
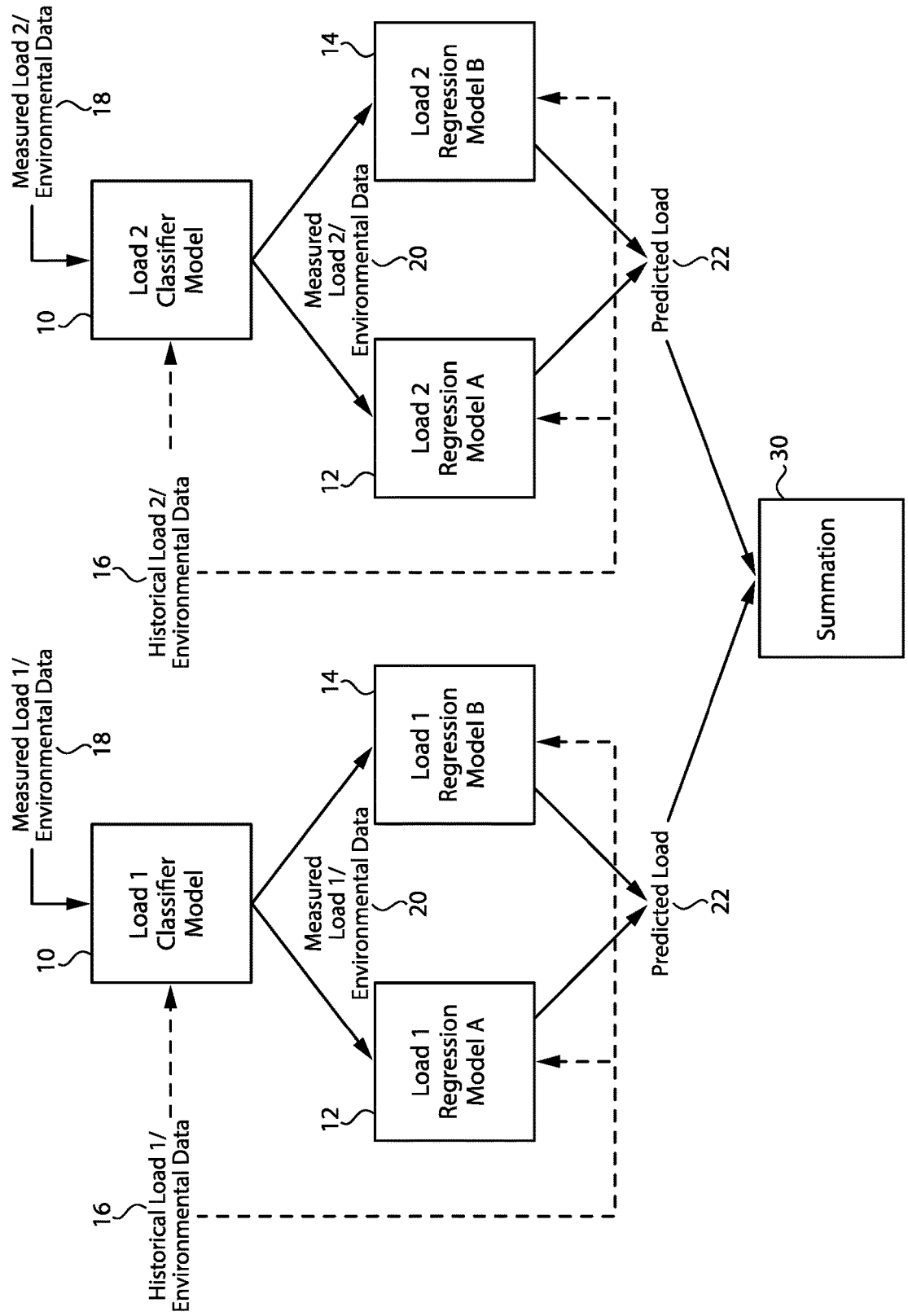
FIG. 3 is another flow chart of another method of predicting an aggregate electrical load.

In FIG. 3, another embodiment with prediction of an aggregated load is shown. This hierarchical method may predict energy consumption 22 of multiple loads which are measured at a single point, such as the sum total residential or commercial power rather than just the HVAC power. The aggregated load may include an HVAC system, water heater, refrigerator, other home appliances, lighting, home entertainment systems, etc. It can be difficult to predict total load since the total load is influenced by a number of different systems. By disaggregating the loads, an improved prediction may be possible. In the first step, the mode of operation 20 of each load may be determined, e.g., on or off, peak/non-peak for a home in a neighborhood, or occupied/unoccupied for a room in a commercial building. Next, the energy consumption 22 of each individual load is determined for the mode based on historical data 16. Test data from the equipment manufacturer may also be used. Finally, the predicted individual loads 22 are summed 30 in order to find the predicted energy consumption 30 of the full residence, building or aggregated load.

In one example, the load at the point of connection to the grid may be measured, which generates a historical record of the total building load. Then, the sub-metered load at the HVAC, water heater and refrigerator may be measured. The sub-metered measurements may be used to train the models 10, 12, 14 for each load. Additionally, the sub-metered measurements may also be subtracted from the measurement at the point of connection to the grid to provide a residual load. The residual load data may then be used to generate a fourth prediction model to predict the residual load. Hierarchical prediction models may thus be created for the HVAC, water heater, refrigerator and residual load. Each of these predictions may then be summed to determine a prediction 30 for the total home or commercial building.

One improvement of the prediction methods described herein is a hierarchical prediction architecture that first uses a classifier to determine the mode of operation of a load and regression models to determine energy consumption in each mode. A hierarchical prediction architecture with a sequential pattern miner may also automatically identify modes of operation and create regression models for each mode. A sum of predictions architecture may also be used to predict the energy consumption of a group of loads, such as appliances in a home, homes in a neighborhood, rooms in a building, etc. The methods herein may be particularly useful in building automation systems, microgrids, and load forecasting systems for electrical distribution networks. Load prediction may be used in microgrids and electrical distribution networks in order to make dispatch plans for energy production resources. Load prediction may also be used in systems for load shedding. Such load shedding may be used as a "nega-watt" generator for dispatch, for demand response programs, for frequency control, or for peak shaving in buildings to avoid peak demand charges. Having an understanding of the future behavior of electrical loads enables each system to adjust the behavior of its generators, energy storage resources and controlled loads in order to optimize the overall performance of the system.

Figure 4:
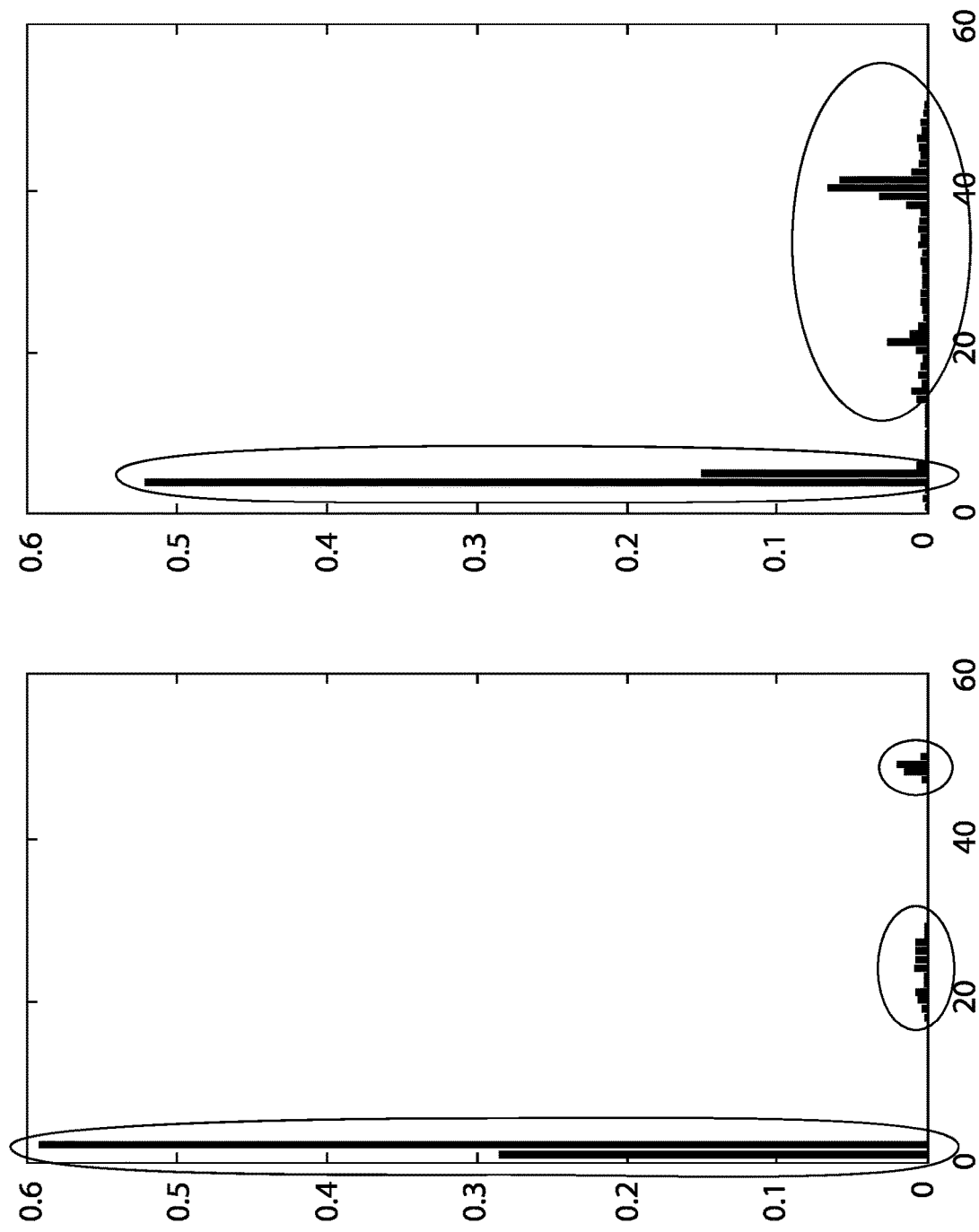
FIG. 4 shows two histograms of a high variance load and a low variance load.

The methods herein may be used to improve the prediction of loads with high variance. For example, FIG. 4 illustrates histograms for two residential loads in a distribution network. The histograms show the number of measured energy consumption samples that fall into each bin of power consumption, from 0 to 60 kWh. The x-axis is defined by the power that was measured, rounded to the nearest bin value, while the y-axis is defined by the percentage of the total number of samples that were measured for that bin. As shown, the load on the left has three clusters of energy consumption values with large spaces of unoccupied bins between each cluster. Such a load is considered to have a high variance. By contrast, the load on the right has two clusters of energy consumption values with the unoccupied space between the clusters being relatively smaller. Thus, the load on the right has lower variance.

Conventional machine learning methods for regression have lower accuracy when predicting the behavior of systems with high variance. These methods often presume that the system behavior has a Gaussian probability that falls over a continuous range. However, if that assumption is not valid, as with the load on the left, these methods will not provide an accurate prediction. Such methods tend to try to provide an average behavior that falls between each cluster of behaviors, which ends up poorly predicting all of the clusters. Some non-linear machine learning techniques are better at handling large variances, such as k-nearest neighbor (KNN) and Markov chains. Physics based models can also be used to find these mode changes.

The methods herein overcome the problem of variance by breaking the problem into sub-sets with lower variance. The classifier is designed to specifically pick out clusters of behavior. By starting with a classifier, much of the variance can be eliminated. A regression model can have very good performance with these smaller, lower variance clusters. Such models require less expert knowledge and effort to set up than a physics based model. While KNN and Markov chains may be able to find these clusters and predict them fairly well, it is anticipated that breaking up the problem first will improve the overall accuracy compared to building a model with these techniques that takes the full data set into account.

A further advantage of the described methods is that a pattern miner may be used to eliminate expert knowledge, and indeed human intervention, altogether. A pattern miner may also identify clusters that would be missed by a human classifying the data. Finally, the pattern miner can handle large data sets automatically which can save a significant amount of labor.

In another improvement, individual loads may be predicted and then added together. Thus, a difficult or insoluble prediction problem can be divided into smaller manageable predictions. Aggregated loads may have many different inputs, which requires data from many different systems in order to predict the overall behavior. However, it can be difficult to disentangle the effects of different systems that operate at the same time. By breaking down the prediction into each subsystem, the matter of causation can be addressed and the overall prediction can be improved.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method of compensating electrical power distribution, comprising:
   collecting input data comprising load and/or environmental data;
   classifying the input data into a first set of data and a second set of data, the first set of data defining one level of power consumption and the second set of data defining another level of power consumption;
   predicting a first power consumption for a first period corresponding to the first set of data;
   predicting a second power consumption for a second period corresponding to the second set of data;
   determining an expected power consumption based on the first power consumption or the second power consumption; and
   shedding an electrical load or increasing an electrical supply based on the expected power consumption;
   wherein the first set of data defines a valley of power consumption based on a first operating mode and the second set of data defines a peak of power consumption based on a second operating mode.

2. The method according to claim 1, wherein the expected power consumption is determined at different times based on the first power consumption and the second power consumption.

3. The method according to claim 1, wherein the first set of data is not used to predict the second power consumption and the second set of data is not used to predict the first power consumption.

4. The method according to claim 1, wherein the first set of data is defined by an electrical device being at a lower power level and the second set of data is defined by the electrical device being at a higher power level.

5. The method according to claim 4, wherein electrical device is off at the lower power level and is on at the higher power level.

6. The method according to claim 4, wherein the electrical device is an HVAC system.

7. The method according to claim 1, further comprising predicting whether an electrical device will be off or on at a future time, wherein the first power consumption is used to determine the expected power consumption at the future time when the electrical device is predicted to be off, and the second power consumption is used to determine the expected power consumption at the future time when the electrical device is predicted to be on.

8. The method according to claim 1, wherein the electrical load is an HVAC system, and the HVAC system is shed in response to determining the expected power consumption.

9. The method according to claim 1, wherein the expected power consumption is determined for a future time of at least five minutes.

10. The method according to claim 1, wherein the expected power consumption is determined for a future time of less than 10 hours.

11. The method according to claim 1, wherein the load and/or environmental data comprises outdoor air temperature, a user setpoint and time of day.

12. The method according to claim 1, wherein classifying the input data comprises training a classifier model using historical load and/or environmental data and operating the classifier model after training using current load and/or environmental data to predict the first and second power consumptions.

13. The method according to claim 12, wherein training the classifier model comprises supervised learning where the historical load and/or environmental data comprises defined modes of operation.

14. The method according to claim 12, wherein training the classifier model comprises unsupervised learning where the historical load and/or environmental data does not include defined modes of operation and the unsupervised learning determines modes of operation.

15. The method according to claim 12, wherein the historical load and/or environmental data comprises power usage, outdoor air temperature, a user setpoint and time of day.

16. The method according to claim 1, wherein classifying the input data comprises a machine learning model.

17. The method according to claim 1, wherein classifying the input data comprises a neural network algorithm.

18. The method according to claim 17, wherein the neural network algorithm comprises Perceptron, a decision tree or a support vector machine (SVM).

19. The method according to claim 1, wherein predicting the first power consumption and predicting the second power consumption comprises different regression models.

20. The method according to claim 19, wherein the different regression models each comprises a recurrent neural network (RNN).

21. The method according to claim 1, wherein classifying the input data comprises classifying the input data into more than two sets of data, and further comprising predicting a power consumption corresponding to each of the more than two sets of data.

22. The method according to claim 1, further comprising classifying the input data for at least two different electrical loads, determining the expected power consumption for each of the two different electrical loads based on the first and second power consumptions, respectively, and summing the expected power consumptions for the two different electrical loads to determine an aggregated load.

23. The method according to claim 22, further comprising subtracting the aggregated load from a total load to determine a residual load.

* * * * *